US009275428B2

(12) United States Patent
Chapman

(10) Patent No.: US 9,275,428 B2
(45) Date of Patent: Mar. 1, 2016

(54) DARK TO LIGHT WATERMARK WITHOUT SPECIAL MATERIALS

(71) Applicant: XEROX CORPORATION, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 30 days.

(21) Appl. No.: 14/220,866

(22) Filed: Mar. 20, 2014

(65) Prior Publication Data

US 2015/0269703 A1    Sep. 24, 2015

(51) Int. Cl.
*G06T 1/00* (2006.01)
*H04N 1/32* (2006.01)

(52) U.S. Cl.
CPC .......... *G06T 1/0021* (2013.01); *H04N 1/32144* (2013.01); *H04N 1/32208* (2013.01); *H04N 1/32251* (2013.01); *H04N 1/32561* (2013.01); *G06T 2201/0051* (2013.01); *G06T 2201/0062* (2013.01); *H04N 2201/3239* (2013.01); *H04N 2201/3243* (2013.01)

(58) Field of Classification Search
CPC ..................... G06T 1/0021; G06T 2201/0051; G06T 2201/0062; H04N 1/32144; H04N 1/32208; H04N 1/32251; H04N 1/32561; H04N 2201/3239
USPC .................. 358/3.28; 101/491; 382/100, 103
See application file for complete search history.

(56) References Cited

U.S. PATENT DOCUMENTS

| | | |
|---|---|---|
| 4,210,346 A | 7/1980 | Mowry, Jr. et al. |
| 5,695,220 A | 12/1997 | Phillips |
| 5,734,752 A | 3/1998 | Knox |
| 6,032,004 A | 2/2000 | Mirabella, Jr. et al. |
| 6,108,512 A | 8/2000 | Hanna |
| 7,092,128 B2 | 8/2006 | Wang et al. |
| 7,126,721 B2 | 10/2006 | Wang et al. |
| 7,180,635 B2 | 2/2007 | Wang et al. |
| 7,193,751 B2 | 3/2007 | Wang et al. |
| 7,639,400 B2 | 12/2009 | Hains |
| 7,852,515 B2 | 12/2010 | Eschbach et al. |
| 7,894,103 B2 | 2/2011 | Wang et al. |
| 8,064,100 B2 | 11/2011 | Braun et al. |
| 8,064,102 B1 | 11/2011 | Zhao et al. |
| 8,111,432 B2 | 2/2012 | Eschbach et al. |
| 8,482,802 B2 | 7/2013 | Tai et al. |
| 2008/0080738 A1* | 4/2008 | Takahashi et al. ............ 382/100 |
| 2008/0302263 A1 | 12/2008 | Eschbach et al. |
| 2008/0305444 A1 | 12/2008 | Eschbach et al. |
| 2010/0128321 A1 | 5/2010 | Wang et al. |
| 2010/0231980 A1* | 9/2010 | Chapman et al. ............ 358/3.28 |

* cited by examiner

*Primary Examiner* — Quang N Vo
(74) *Attorney, Agent, or Firm* — Gibb & Riley, LLC

(57) ABSTRACT

Methods and systems rasterize a document to produce a bitmap having first pixels of a first color as background uniformly located across a watermark region and second pixels of a second color located in a pattern forming foreground items within the watermark region. The rasterization causes the first pixels to deposit a first marking material (forming the first color) to a first height on the print media, and the rasterization causes the second pixels to deposit a second marking material (forming the second color) to a second height (different from the first height) on the print media. In the printed document, by having the first color be different from the second color and the second height be different from the first height, this causes the relative darkness between the background and the foreground items to reverse when the printed document is viewed from different angles (relative to a light source).

16 Claims, 5 Drawing Sheets

DARK TO LIGHT WATERMARK WITHOUT SPECIAL MATERIALS

BACKGROUND

System and methods herein generally relate to watermark security printing and more particularly to systems, devices, and methods that print watermarks that change based upon the viewing angle of the printed sheets relative to a light source, using standard printing materials.

In the area of security printing, documents are protected from copying, forging and counterfeiting using multiple techniques. Some methods of security printing use standard materials such as papers inks and toners; however, more typically security printing requires special and expensive materials. Example documents needing security printing include legal documents, negotiable documents, prescriptions, etc., where a user would like to be able to have a high level of confidence that the document is genuine.

For example, color shifting ink appears as one color from a certain angle and another color from another angle. However, such color shifting printing requires a very specialized ink, that can be regulated and/or expensive. Many US currency denominations use regulated color-shifting ink to print the numerals located in the corners on the front of the bill. One example of color shifting printing is on a US twenty dollar bill at the bottom right corner where the number 20 appears gold or green depending on how the bill is tilted. Similarly, on a genuine $100 banknote, the green color will "shift" to grey and back to green as the bill is tilted back and forth to change the viewing angle (and the $100 bill available October 2013 goes from copper to green).

The "optically variable ink," as it is officially called, is not widely commercially available. Most of it comes from a Swiss manufacturer (SCIPA), which grants the U.S. exclusive rights to the green-and-black ink used for printing dollars. One feature of optically variable ink is that such ink cannot be replicated by copiers, because copiers only "see" and replicate patterns from a fixed angle.

Some printing techniques enable printing small overt security features that could not easily be copied by a digital copier, if at all. However documents protected with such features can potentially be reproduced with reverse engineering.

SUMMARY

Exemplary methods herein receive a document to be printed into a computerized device. The document can include a designation of a watermark region within the document. The designation of the watermark can identify a first color and a second color (different from the first color) for use in the watermark region. Some methods herein can adjust the first color and/or the second color to comprise different shades of a single color visually distinguishable from one another if the originally designated colors are too similar (or are too dissimilar), or are not designated in the received document.

The methods herein automatically, using the computerized device, process the document into a print ready format document to produce the first color as background uniformly located across the watermark region and the second color located in a pattern forming foreground items within the watermark region. The first color is deposited to a first height on print media, and the second color is deposited to a second height on the print media (different from the first height) in the print ready format document, where the height difference between the first height and the second height is a multiple of at least 1.5.

More specifically, the methods herein automatically (using the computerized device) rasterize the document to produce a bitmap having first pixels of the first color as background uniformly located across the watermark region and second pixels of the second color located in a pattern forming foreground items within the watermark region. The rasterization causes the first pixels to deposit a first marking material (forming the first color) to a first height on the print media, and the rasterization causes the second pixels to deposit a second marking material (forming the second color) to a second height (different from the first height) on the print media.

Such methods then print the document using the bitmap to produce a printed document, using a printing device operatively connected to the computerized device. In the printed document, by having the first color be different from the second color and the second height be different from the first height, this causes the relative darkness between the background and the foreground items to reverse when the printed document is viewed from different angles (relative to a light source). More specifically, the reversal of the relative darkness between the background and the foreground items is visible to the human observer (or camera, optical sensor, etc.) as the darkness of the background color is darker than the foreground items when the printed document is viewed from a first angle relative to the light source, but the darkness of the background color is less dark than the foreground items when the printed document is viewed from a second (different) angle relative to the light source.

Systems herein include (among other components) a computerized device receiving a document to be printed, a processor operatively (meeting directly or indirectly) connected to the computerized device, and a printing device operatively connected to the computerized device. The document can include a designation of a watermark region within the document. The designation of the watermark can identify a first color and a second color different from the first color for use in the watermark region. The processor can adjust the first color and/or the second color to comprise different shades of a single color visually distinguishable from one another if the originally designated colors are too similar (or are too dissimilar), or are not designated in the received document.

The processor automatically rasterizes the document to produce a bitmap having first pixels of the first color as background uniformly located across the watermark region, and second pixels of the second color located in a pattern forming foreground items within the watermark region. The rasterizing causes the first pixels to deposit a first marking material forming the first color to a first height on the print media, and the rasterizing also causes the second pixels to deposit a second marking material forming the second color to a second height on the print media different from the first height.

The printing device prints the document using the bitmap to produce a printed document. The first color being different from the second color and the second height being different from the first height causes the relative darkness between the background and the foreground items to reverse when the printed document is viewed from different angles relative to a light source.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, some printing techniques enable printing small overt security features that are not easily copied by a digital copier. To provide security without using specialized and expensive equipment and toners, devices and methods herein utilize dark to light shifting without special materials (using just standard CMYK ink/toner materials, or other standard marking materials that form marks on sheets of print media). This is accomplished by creating high and low regions of similar colors. One region goes from dark to light at the same time the other region goes from light to dark creating a distinct watermark when tilting.

Figure 1:
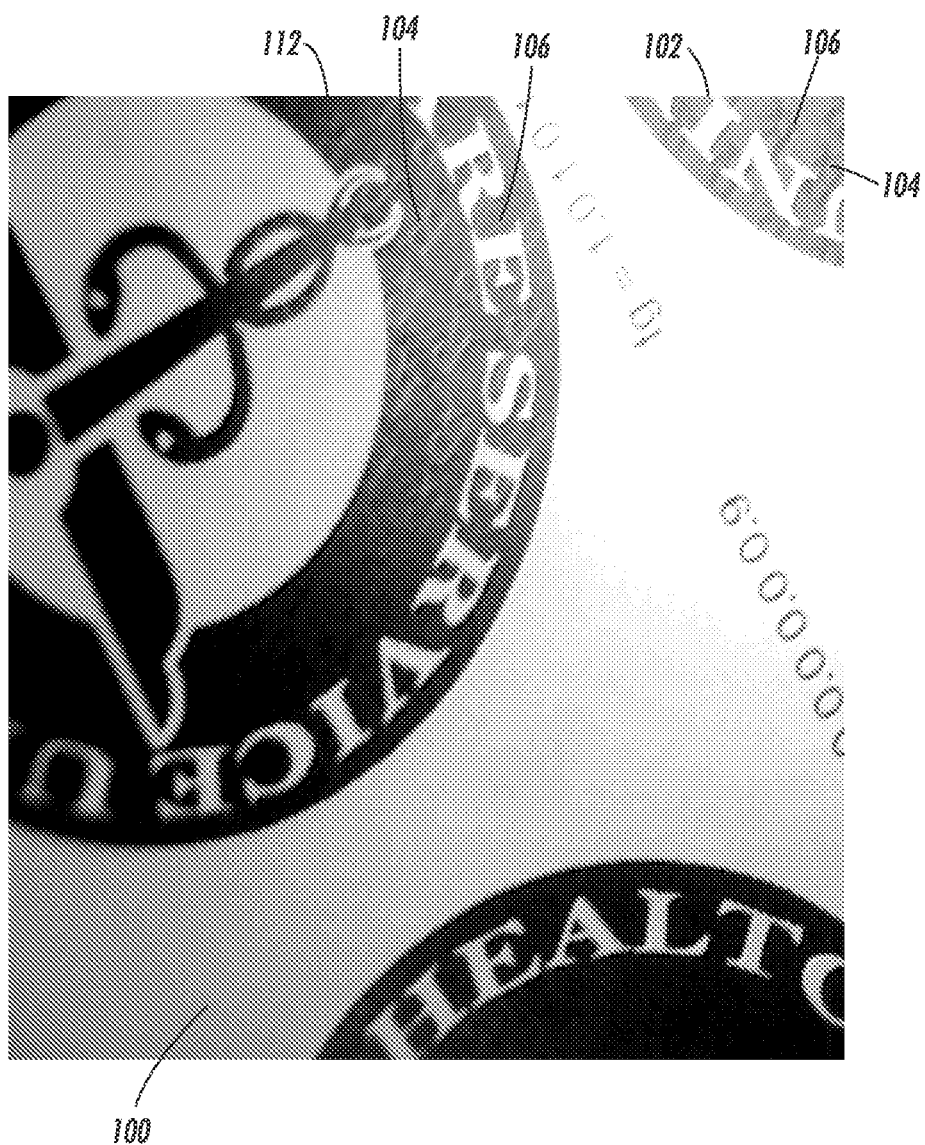
FIG. 1 is an image printed according to embodiments herein.

FIG. 1 shows an example of a sheet or web of print media 100 (paper, card stock, transparencies, metal, plastics, etc.) having a number of round seals 102 and 112 printed thereon. All the seals 102 and 112 were printed identically using the same bitmap for each seal. The visual differences between the different seals 102 and 112 appearing in FIG. 1 are produced by the systems and methods herein that utilize different toner pile heights and different colors for foreground items 104 and background 106 that cause the seals 102 and 112 to appear differently depending upon the viewing angle with respect to a light source.

More specifically, the image in FIG. 1 is a photograph taken with the print media 100 positioned to have a curvature (so that the print media 100 is curved (e.g., non-flat or non-perpendicular) relative to the light source) with the light source (which is out of view of the image in FIG. 1). The curvature of the print media 100 relative to the light source in FIG. 1 causes the viewing angle from which the photograph of FIG. 1 was taken to change relative to the light source and thereby demonstrate how the print media sheet 100 will appear when viewed from different angles relative to given light source. If the media is curved, the observer sees both the light and dark RX's, but this effect is also seen on non-curved media because the angle of the light/media/observer changes as the sheet is moved even if the media is not curved.

Figure 2:
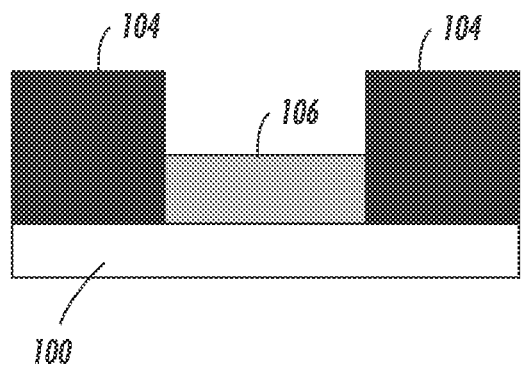
FIG. 2 is a cross-sectional view of toner piles on a sheet of print media.

The printed item 100 has a first seal 102 having one region of repeating relatively darker "Rx" foreground items 104. As shown in the cross-sectional view of marking material 104, 106 (e.g., ink, toner or, etc.) on a sheet of print media 100 in FIG. 2, the foreground items 104 are created using a relatively higher toner pile height region of a first color relative to the background 106 that is created using a lower toner pile height region of a second color. A second background region 106 (the rest of the gray seal) is created using a different second color and another toner pile that is relatively lower than the first region 104. The second color of the background 106 is different than the first color of the foreground items 104. FIG. 2 is only one example, and in other examples, the height of the marking material of the background 106 could be greater than the foreground 104.

As noted above, seal 112 is identical to seal 102; however, the angle of viewing shown in FIG. 1 reverses the brightness of the foreground items 104 and background 106 relative to that shown in the first seal 100. Specifically, the foreground items 104 appear lighter than the background 106 in the view of seal 112 in FIG. 1. Such visual differences are not caused by the seals 102 and 112 being printed differently; instead, these visual differences are caused by the similar but different colors used for the foreground items 104 and background 106 in combination with different marking material (toner) heights used during printing. More specifically, utilizing different marking material heights alters the gloss characteristic of the items printed. Therefore, the foreground items 104 will have a different gloss characteristic than the background 106, which causes of the foreground items 104 to visually change their gloss differently relative to the visual gloss level change of the background 106, which in turn switches the relative brightness of the foreground items 104 to the background 106.

Because different colors or shades are utilized for the foreground items 104 and the background 106, the Rx (foreground items 104) are readable relative to the background at all angles when tilting. However, as described above, the different colors in combination with the different gloss levels caused by utilizing different heights of marking material causes the relative brightness of the foreground items 104 and background 106 to switch as the user's angle to the printed media changes (relative to the light source).

While the color differences between the foreground items 104 and the background 106 will be reproduced by copiers, the brightness switching feature of the watermark will not be reproduced by copiers or scanners, because the copier/scanner will only distinguish the color difference, and will not distinguish the marking material height differences.

Regarding the different marking material heights, different pixels within the bitmap are individually controlled to deposit different volumes of marking material to create such marking material height differences. Therefore, in one example of a system that uses cyan, magenta, yellow, black (CMYK) toners, the pixels for the Rx's (foreground items 104) in FIG. 1 can be set to deposit on the print media 100% black and 50% each of cyan, magenta and yellow, for a height of 250%. The pixels of the background 106 can be set, for example, to deposit on the print media 90% black for a height of 90%. Thus, in this example, the marking material of the foreground items 104 is approximately 2.8 times the height of the marking material of the background 106. However, in different situations the height difference of the two marking materials can vary to achieve any desired affect (e.g., from a multiple of 1.5 to a multiple of 10, or other ranges). This height difference of the marking material of the pixels in the bitmap produces different gloss levels, which in turn causes the background 106 to change from relative light to dark as the viewing angle changes, while the Rx's 104 change from relative dark to light with the same change in viewing angle.

Note, that in some of the portions of the seals shown in FIG. 1, the Rx's are not highly visible; however, this is only caused by a low light condition in the photograph of FIG. 1 and when the printed output is viewed by the user with at least minimal light available, the foreground items 104 are always visible against the background 106 because of the different colors utilized for these two elements.

In addition, while different shades of black are shown in the accompanying drawings, the systems and methods herein also function using different colors for the background and foreground items. Also, while an increased marking material height is mentioned as being used with a darker color in some examples herein, the greater marking material height can also be used for the lighter color within the watermark by methods and systems herein.

Further, the "standard" toners, inks, and marking materials that are utilized by the methods and systems herein are those marking materials that are used to perform generalize printing of documents, photographs, artwork, and other two-dimensional items (such as standard CMYK toners, RGB inks, etc.) in mass-produced consumer and industrial printers. To the contrary, "specialized" inks, toners, and marking materials are those used for printing a specialized document that has a single function, such as magnetic inks used for printing checks, color shifting inks used for printing currency, specialized white or gloss materials used in specialty photographic printing systems, etc. Therefore, the methods and systems herein provide a watermark that changes as the viewing angle changes, without incurring the expense and sophistication required in specialized printing systems.

Figure 3:
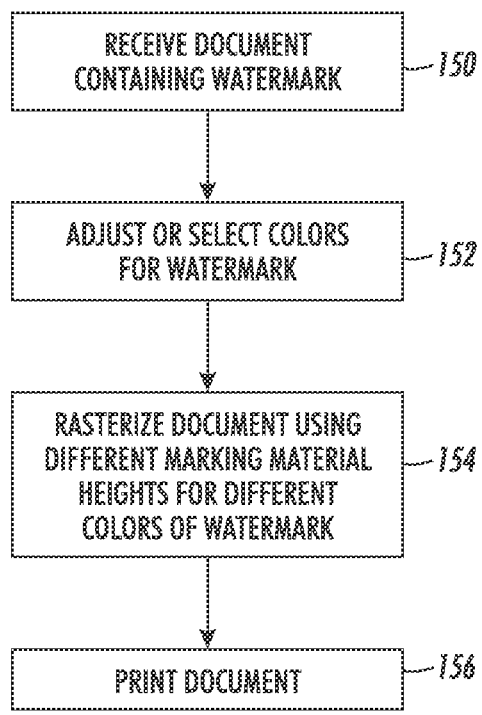
FIG. 3 is a flow diagram illustrating various embodiments herein.

FIG. 3 is a flowchart illustrating processing performed by exemplary methods herein. In item 150, such methods receive a document to be printed into a computerized device. The document can include a designation of a watermark region within the document.

The designation of the watermark can identify a first color and a second color (different from the first color) for use in the watermark region. As shown in item 152, some methods herein can adjust (or select) the first color and/or the second color to comprise different shades of a single color visually distinguishable from one another, if the originally designated colors are too similar (or are too dissimilar), or are not designated in the received document. For example, the watermark can utilize different shades of the same color such as black (such as pure black and gray) or the watermark can utilize different colors (e.g., red, yellow, green) that are easily distinguishable from one another. Therefore, in item 152, if colors or shades are automatically changed, the methods can output a notice of such changes to the user through a graphical user interface, and can provide an option for the user to accept or reject such changes.

As shown in item 154, the methods herein automatically (using the computerized device) process the document into a print ready format document to produce the first color as background uniformly located across the watermark region and the second color located in a pattern forming foreground items within the watermark region. The first color is deposited to a first height on print media, and the second color is deposited to a second height on the print media (different from the first height) in the print ready format document, where the height difference between the first height and the second height is a multiple of at least 1.5.

More specifically, in item 154, the methods herein automatically (using the computerized device) rasterize the document to produce a bitmap having first pixels of the first color as background uniformly located across the watermark region and second pixels of the second color located in a pattern forming foreground items within the watermark region. The rasterization causes the first pixels to deposit a first marking material (forming the first color) to a first height on the print media, and the rasterization causes the second pixels to deposit a second marking material (forming the second color) to a second height (different from the first height) on the print media.

Such methods then print the document using the bitmap to produce a printed document, using a printing device operatively connected to the computerized device in item 156. In the printed document, by having the first color be different from the second color and the second height be different from the first height, this causes the relative darkness (or, stated another way, relative brightness) between the background and the foreground items to reverse (e.g., to switch) when the printed document is viewed from different angles (relative to a light source).

More specifically, as shown in FIG. 1, the reversal of the relative darkness (and brightness) between the background and the foreground items is visible to the human observer as the darkness of the background color is darker than the foreground items when the printed document is viewed from a first angle relative to the light source (112), but the darkness of the background color is less dark than the foreground items when the printed document is viewed from a second (different) angle relative to the light source (102).

Figure 4:
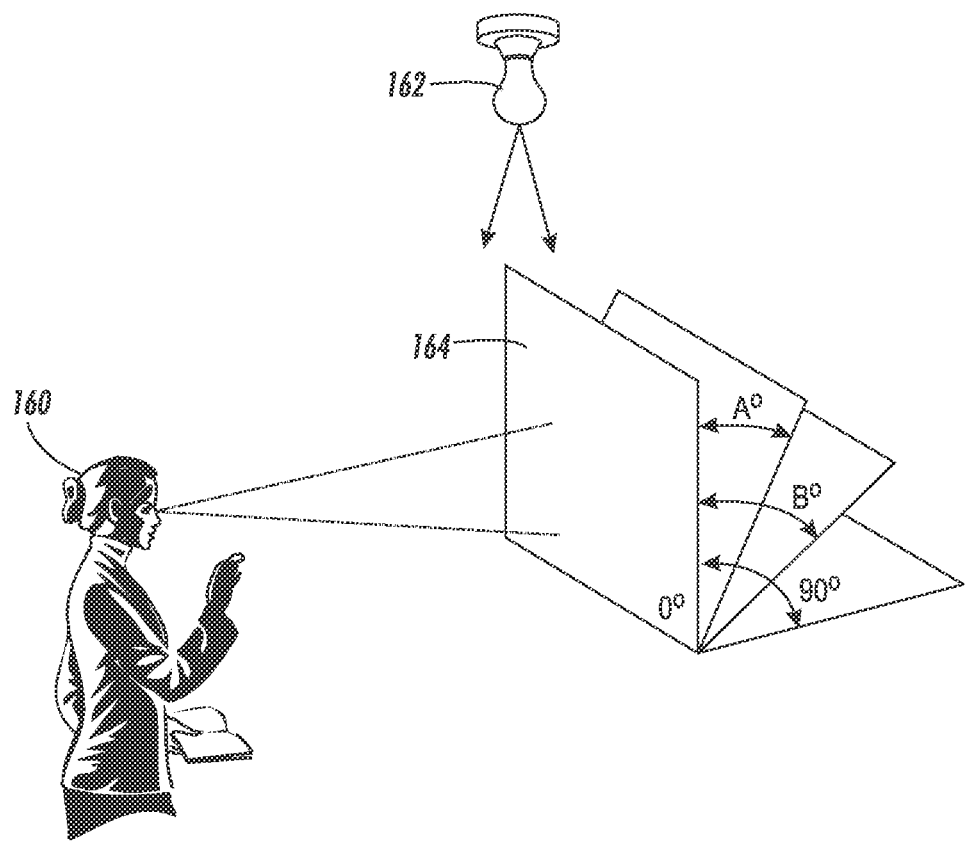
FIG. 4 is a schematic diagram illustrating effects achieved by embodiments herein.

As mentioned above, the reversal of the relative darkness (and brightness) between the background and the foreground items are visible to the human observer as the printed document is viewed from different angles relative to the light source. As shown in FIG. 4, the observation of the watermark depends on the relative positions of the light source 162, the observer 160, and the printed sheet 164. As shown in FIG. 4, as the printed sheet of media 164 is tilted so that the printed sheet 164 is viewed at a non-perpendicular angle (e.g., at A°, B°, etc.) the darkness of the background color may be seen as darker than the foreground items to the observer 160 of the watermark. As the tilting of the printed sheet 164 continues, the darkness of the foreground items' color may be seen as darker than the background to the observer 160. As would be understood by those ordinarily skilled in the art, the angles when the relative darkness reverses (e.g., A° and B° in this arbitrary example) will change as the position between the light source 162, the observer 160, and the printed sheet 164 change.

Figure 5:
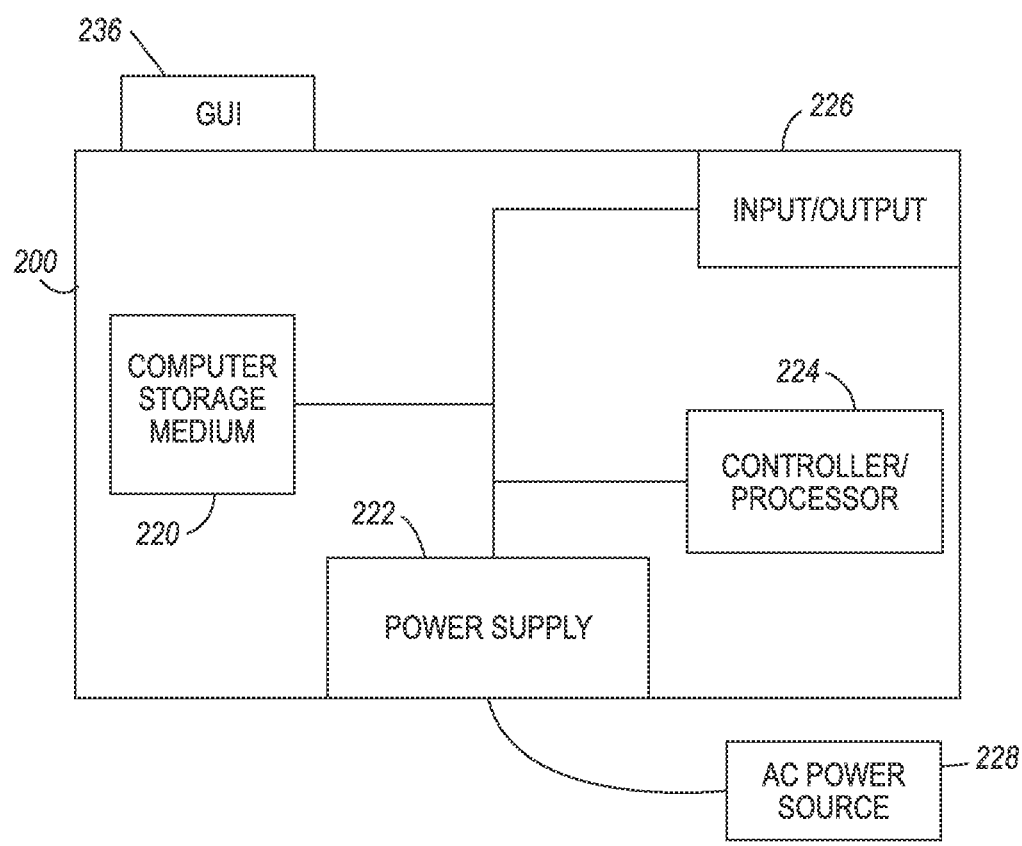
FIG. 5 is a side-view schematic diagram of a device according to embodiments herein.

FIG. 5 illustrates a computerized device 200, which can be used with embodiments herein and can comprise, for example, a print server, a personal computer, a portable computing device, etc. The computerized device 200 includes a controller/processor 224 and a communications port (input/output) 226 operatively connected to the processor 224 and to a computerized network external to the computerized device 200. Also, the computerized device 200 can include at least one accessory functional component, such as a graphical user interface assembly 236 that also operates on the power supplied from the external power source 228 (through the power supply 222).

The input/output device 226 is used for communications to and from the computerized device 200. The processor 224 controls the various actions of the computerized device. A non-transitory (non-volatile) computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 5, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 6:
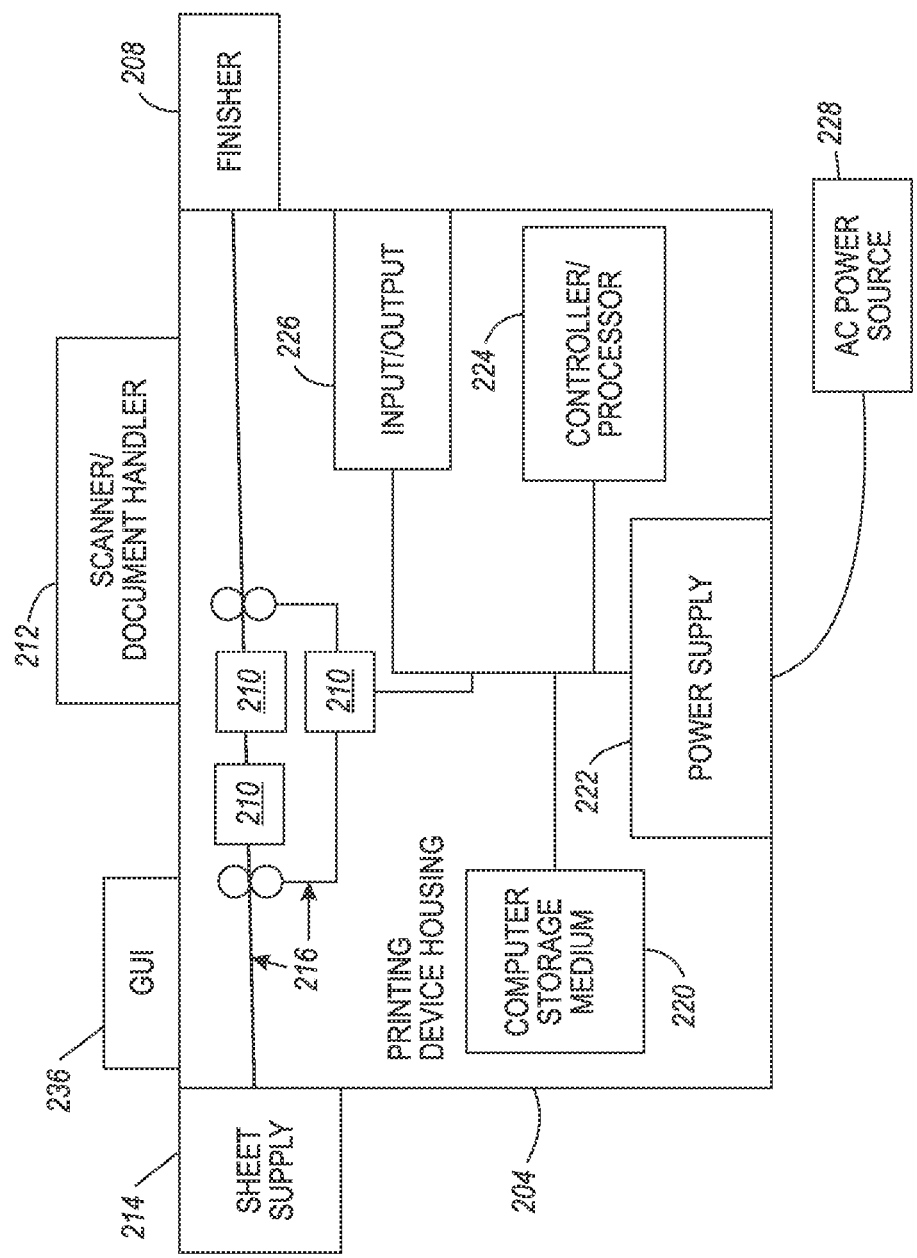
FIG. 6 is a side-view schematic diagram of a device according to embodiments herein.

FIG. 6 illustrates a computerized device that is a printing device 204, which can be used with embodiments herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operate on the power supplied from the external power source 228 (through the power supply 222).

In either type of device, the processor 224 can adjust the first color and/or the second color to comprise different shades of a single color visually distinguishable from one another if the originally designated colors are too similar (or are too dissimilar), or are not designated in the received document.

The processor 224 automatically rasterizes the document to produce a bitmap having first pixels of the first color as background uniformly located across the watermark region, and second pixels of the second color located in a pattern forming foreground items within the watermark region. The rasterizing causes the first pixels to deposit a first marking material forming the first color to a first height on the print media, and the rasterizing also causes the second pixels to deposit a second marking material forming the second color to a second height on the print media different from the first height.

The printing device 204 prints the document using the bitmap to produce a printed document. The first color being different from the second color and the second height being different from the first height causes the relative darkness between the background and the foreground items to reverse when the printed document is viewed from different angles relative to a light source.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphical user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A raster image tangible processor (RIP) is a component used in a printing system that produces a raster image also known as a bitmap. The bitmap is then sent to a printing device for output. Raster image processing is the process that turns vector digital information into a high-resolution raster image.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    receiving a document to be printed into a computerized device, said document including a designation of a watermark region within said document, said designation of said watermark region identifying a first color and a second color visually distinguishable at all viewing angles from said first color for use in said watermark region;
    automatically, using said computerized device, processing said document into a print ready format document to produce said first color as background uniformly located across said watermark region and said second color located in a pattern forming foreground items within said watermark region, said first color being deposited to a first height on a print media, and said second color being deposited to a second height on said print media different from said first height in said print ready format document; and
    printing said print ready format document to produce a printed document, using a printing device operatively connected to said computerized device,
    said first color being visually distinguishable from said second color and said second height being different from said first height causing a relative darkness between said background and said foreground items to reverse when said printed document is viewed from different angles relative to a light source.

2. The method according to claim 1, said causing said relative darkness between said background and said foreground items to reverse comprising:
    causing a darkness of said background to be darker than said foreground items when said printed document is viewed from a first angle relative to said light source; and
    causing a darkness of said background to be less dark than said foreground items when said printed document is viewed from a second angle relative to said light source, said first angle being different from said second angle.

3. The method according to claim 1, further comprising adjusting said first color and said second color to comprise different shades of a single color visually distinguishable from one another.

4. The method according to claim 1, a height difference between said first height and said second height being a multiple of at least 1.5.

5. A method comprising:
    receiving a document to be printed into a computerized device, said document including a designation of a watermark region within said document, said designation of said watermark region identifying a first color and a second color visually distinguishable at all viewing angles from said first color for use in said watermark region;
    automatically, using said computerized device, rasterizing said document to produce a bitmap having first pixels of said first color as background uniformly located across said watermark region and second pixels of said second color located in a pattern forming foreground items within said watermark region, said rasterizing causing said first pixels to deposit a first marking material forming said first color to a first height on a print media, and said rasterizing causing said second pixels to deposit a second marking material forming said second color to a second height on said print media different from said first height; and
    printing said document using said bitmap to produce a printed document, using a printing device operatively connected to said computerized device,
    said first color being visually distinguishable from said second color and said second height being different from said first height causing a relative darkness between said background and said foreground items to reverse when said printed document is viewed from different angles relative to a light source.

6. The method according to claim 5, said causing said relative darkness between said background and said foreground items to reverse comprising:
    causing a darkness of said background to be darker than said foreground items when said printed document is viewed from a first angle relative to said light source; and
    causing a darkness of said background to be less dark than said foreground items when said printed document is viewed from a second angle relative to said light source, said first angle being different from said second angle.

7. The method according to claim 5, further comprising adjusting said first color and said second color to comprise different shades of a single color visually distinguishable from one another.

8. The method according to claim 5, a height difference between said first height and said second height being a multiple of at least 1.5.

9. A system comprising:
    a computerized device receiving a document to be printed, said document including a designation of a watermark region within said document, said designation of said watermark region identifying a first color and a second color visually distinguishable at all viewing angles from said first color for use in said watermark region;
    a processor operatively connected to said computerized device, said processor automatically processing said document into a print ready format document to produce said first color as background uniformly located across said watermark region and said second color located in a pattern forming foreground items within said watermark region, said first color being deposited to a first height on a print media, and said second color being deposited to a second height on said print media different from said first height in said print ready format document; and
    a printing device operatively connected to said computerized device, said printing device printing said print ready format document to produce a printed document, said first color being visually distinguishable from said second color and said second height being different from said first height causing a relative darkness between said background and said foreground items to reverse when said printed document is viewed from different angles relative to a light source.

10. The system according to claim 9, said causing said relative darkness between said background and said foreground items to reverse comprising:
causing a darkness of said background to be darker than said foreground items when said printed document is viewed from a first angle relative to said light source; and
causing a darkness of said background to be less dark than said foreground items when said printed document is viewed from a second angle relative to said light source, said first angle being different from said second angle.

11. The system according to claim 9, said processor adjusting said first color and said second color to comprise different shades of a single color visually distinguishable from one another.

12. The system according to claim 9, a height difference between said first height and said second height being a multiple of at least 1.5.

13. A system comprising:
a computerized device receiving a document to be printed, said document including a designation of a watermark region within said document, said designation of said watermark region identifying a first color and a second color visually distinguishable at all viewing angles from said first color for use in said watermark region;
a processor operatively connected to said computerized device, said processor automatically rasterizing said document to produce a bitmap having first pixels of said first color as background uniformly located across said watermark region and second pixels of said second color located in a pattern forming foreground items within said watermark region, said rasterizing causing said first pixels to deposit a first marking material forming said first color to a first height on a print media, and said rasterizing causing said second pixels to deposit a second marking material forming said second color to a second height on said print media different from said first height; and
a printing device operatively connected to said computerized device, said printing device printing said document using said bitmap to produce a printed document,
said first color being visually distinguishable from said second color and said second height being different from said first height causing a relative darkness between said background and said foreground items to reverse when said printed document is viewed from different angles relative to a light source.

14. The system according to claim 13, said causing said relative darkness between said background and said foreground items to reverse comprising:
causing a darkness of said background to be darker than said foreground items when said printed document is viewed from a first angle relative to said light source; and
causing a darkness of said background to be less dark than said foreground items when said printed document is viewed from a second angle relative to said light source, said first angle being different from said second angle.

15. The system according to claim 13, said processor adjusting said first color and said second color to comprise different shades of a single color visually distinguishable from one another.

16. The system according to claim 13, a height difference between said first height and said second height being a multiple of at least 1.5.

* * * * *